Dec. 20, 1927.

M. WILDRICK

Re. 16,822

KEYLESS LOCK AND PERMUTATION WHEEL FOR THE SAME

Original Filed Oct. 27, 1924

INVENTOR :

Meade Wildrick

By Attorneys,

Fraser, Myers & Manley

Reissued Dec. 20, 1927. Re. 16,822

UNITED STATES PATENT OFFICE.

MEADE WILDRICK, OF SAVANNAH, GEORGIA, ASSIGNOR, BY MESNE ASSIGNMENTS, TO THE SESAMEE COMPANY, OF HARTFORD, CONNECTICUT, A CORPORATION OF CONNECTICUT.

KEYLESS LOCK AND PERMUTATION WHEEL FOR THE SAME.

Original No. 1,579,046, dated March 30, 1926, Serial No. 746,176, filed October 27, 1924. Application for reissue filed August 17, 1927. Serial No. 213,711.

This invention relates to keyless locks and permutation wheels for the same, and has for one of its objects to provide a lock of this character and a wheel therefor which will be simple in construction, comparatively inexpensive to manufacture and more efficient in use than those heretofore proposed.

A further object of the invention is to provide a permutation wheel which is particularly adapted for use with keyless locks of the general type shown in the prior patent to Alexander G. Hatch, No. 1,555,969, granted October 6, 1925, and entitled "Improvements in keyless locks."

Having the above-mentioned objects in view and others which will appear as the description proceeds, the invention consists in the novel details of construction and combinations and arrangements of parts more fully hereinafter disclosed and particularly pointed out in the appended claims.

Referring to the accompanying drawings forming a part of this specification, in which like reference characters designate like parts in all the views:

Figure 1 is a view in rear elevation, parts being broken away, and parts shown in section, of one form of lock such as is described and claimed in the said patent of A. G. Hatch, No. 1,555,969, the said lock being provided with an improved form of permutation wheel constructed in accordance with the present invention;

Figure 1:
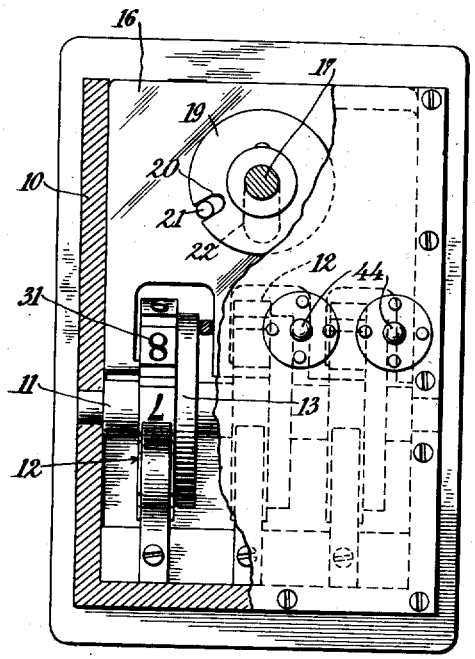
Figure 2:
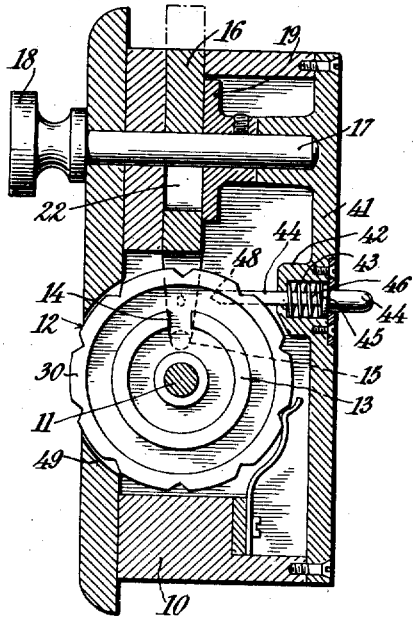
Fig. 2 is a central vertical sectional view of the parts shown in Fig. 1.

Referring first to Figures 1 and 2, the numeral 10 indicates a lock casing in which is suitably mounted a shaft 11. Upon the said shaft is rotatably mounted a plurality of permutation tumblers comprising wheels or disks 12, each of which is provided on one of its flat faces with an annular rib 13 having a cut-away portion or slot 14 through which a toe 15 of a locking bolt 16 is adapted to pass to lock and unlock the bolt in a manner fully set forth in the said Hatch Patent No. 1,555,969. The said bolt 16 is slidably mounted for movement transversely of the axis of the shaft 11 and it is adapted to be reciprocated by means of the transverse shaft 17 having a finger-piece 18 and a disk member 19 provided with a radial slot 20 to receive a pin or stud 21 carried by the bolt 16. The bolt 16 is slotted as at 22 to accommodate the transverse shaft 17, as will be clear from the drawings.

It is highly desirable in this type of lock that provision be made whereby the combination necessary to control the movements of the bolt may be changed from time to time, and to this end the permutation wheels 12 are of a peculiar construction. As is clearly shown in Figs. 3, 4 and 5, each of these wheels may comprise a lock-controlling element, herein disclosed as a disk or body member 25 having a hub 26 to receive the shaft 11, and the said member 25 may be further provided along the flat face opposite the annular rib 13 with a second annular rib or projection 27. This said rib 27 may be spaced from the hub 26 so as to provide a recess 28 for a purpose which will appear more fully below, and the said recess may be normally closed by means of a plate or cross member 29 shown in elevation in Fig. 5.

Loosely mounted upon the disk member 25 and engaging the outer periphery of the same is an indicia-bearing element herein disclosed as a ring member 30, the outer circumference of which may be provided with suitable indicia 31, as shown in Fig. 1. The indicia-bearing ring members may have portions accessible through respective slots 49 (Fig. 2), provided therefor in the casing, by which they may be set by direct manipulation. Each ring member may also be provided with a reduced annular hub portion 32 into which the disk or closure member 29 is received when the parts are assembled, as is clearly indicated in Fig. 4. The said hub portion 32 may also be provided upon its inner circumference with a plurality of arcuately spaced notched or recesses 34, which are adapted to receive the nose of a slidable dog 35, which dog may be mounted in a slot or cut-away portion 36 of the annular rib 27 of the disk member 25 and serve as a coupling for the elements of the tumbler. The inner end of the dog 35 may project slightly beyond the inner circumference of the rib 27 and be engaged by the spring 37 which may be mounted within the recess 28, as clearly shown in Figs. 3 and 4. The dog 35 may also be provided with an angular pin or extension 38 which may project outwardly through a slot 39 in the disk member 29, so that said dog may be manually manipulated, as will appear more fully below. The disk member 29 may be retained in position by means of suitable screws 40 passing therethrough and engaging in the disk member 25.

Figure 3:
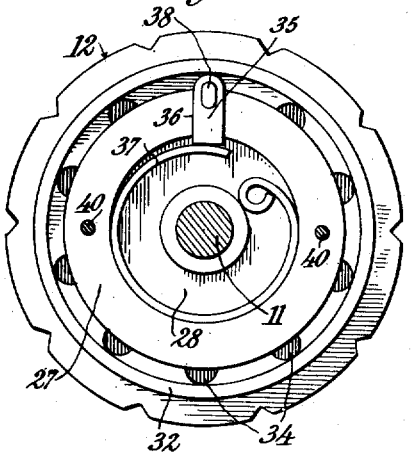
Fig. 3 is an enlarged side view of one of the permutation wheels.
Figure 4:
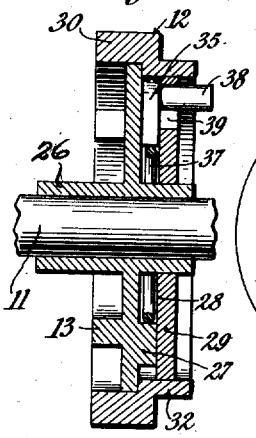
Fig. 4 is a central sectional view through the wheel shown in Fig. 3.
Figure 5:
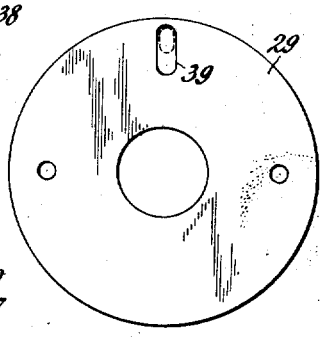
Fig. 5 is a face view of a dog retaining disk or member employed in the wheel shown in Figs. 3 and 4.

Assuming the parts to be in the positions shown in Figs. 3 and 4, with the permutation tumblers in their set positions, should it be desired to change the combination, it is only necessary to move the dog 35 radially inwardly by means of the extension 38, so as to disengage the nose of the said dog from the recess 34 which it happens to be occupying, whereupon the ring member 30 is unlocked from engagement with the body or disk member 25 and may be freely rotated thereon. The relative positions of the two members may therefore be changed, and when the desired position has been reached the dog 35 may be released, whereupon the spring 37 will again force its nose into one of the recesses 34, thereby efficiently locking the parts together again.

In some forms of lock it may be possible to accomplish movements of the dog 35 directly by means of the fingers, but it is preferred to mount in any appropriate part of the lock casing 10 means whereby this may be effectively accomplished without access being had to the interior of the casing. To this end there is provided upon the rear member 41 of the casing (Fig. 2) a boss 42 having a bore 43 therein through which may be passed a push member 44. The said member is provided with a collar or enlargement 45 behind which is mounted a coil spring 46, which spring normally urges the said push member 44 toward the right, as viewed in Fig. 2.

The parts are so designed and constructed that the inner end of the push member 44, which is preferably beveled, as indicated at 48, is in close proximity to the angular extension 38 of the dog 35, and when the member 44 is pushed inwardly the beveled end 48 of the said member will engage the said extension 38 to force the dog 35 out of its recess 34. With the parts held in this position, it is an easy matter to rotate the ring member 30 from the front of the lock, as will be clear from Fig. 2, until the new position of the said member has been attained, whereupon, by releasing the push member 44, the parts will be restored to the positions shown in the drawings and the ring member 30 efficiently locked to the body member 25.

During a resetting of the combination the bolt 16 may be moved to an intermediate position, thereby moving the toes 15 into the slots 14 of the ribs 13, whereby rotation of the lock-controlling elements 25 may be prevented during the setting movements of the indicia-bearing elements 30.

It is obvious that those skilled in the art may vary the details of construction as well as the arrangements of parts without departing from the spirit of the invention, and therefore it is not wished to be limited to the above disclosure except as may be required by the claims.

What is claimed is:

1. A lock comprising a casing, a lock mechanism including a bolt, a plurality of independently settable bolt-controlling permutation tumblers mounted in said casing, each of said tumblers comprising a concealed lock-controlling element and an indicia-bearing element exposed for manipulation through a slot in said casing, couplings normally preventing relative combination changing movements between the composite elements of said tumblers, coupling-disabling means, movable independently of said bolt, and accessible from the exterior of the assembled lock, whereby said couplings may be rendered ineffective, thereby permitting said indicia-bearing elements to be directly and independently moved to effect a change in the combination of the lock while said lock-controlling elements are held fast, and movement-obstructing elements whereby movement of the lock-controlling elements may be prevented during a change of the combination.

2. A lock comprising a casing, a lock mechanism including a plurality of permutation tumblers mounted in said casing, each of said tumblers comprising a concealed lock-controlling element and an indicia-bearing element exposed for manipulation through a slot in said casing, couplings normally preventing relative movement between the composite elements of said tumblers, individual disabling devices accessible from the exterior of the assembled lock, whereby the respective couplings may be selectively rendered ineffective, thereby permitting the indicia-bearing element of any of said tumblers to be moved to effect a change in the combination of the lock while its lock-controlling element is held fast, and movement-obstructing elements whereby movement of the lock-controlling elements may be prevented during a change of the combination.

3. A lock comprising a casing, a lock mechanism including a bolt, a plurality of independently settable bolt-controlling permutation tumblers mounted in said casing, each of said tumblers comprising a concealed lock-controlling element and an indicia-bearing element exposed for manipulation through a slot in said casing, couplings normally preventing relative combination changing movements between the composite elements of said tumblers, coupling-disabling means, movable independently of said bolt, and accessible from the exterior of the assembled lock, whereby said couplings may be rendered ineffective, thereby permitting said indicia-bearing elements to be directly and independently moved to effect a change in the combination of the lock while said lock-controlling elements are held fast, and movement-obstructing elements movable into and out of effective positions by movements of said bolt, whereby movement of the lock-controlling elements may be prevented during a change of the combination.

4. A lock comprising a casing, a lock mechanism including a plurality of permutation tumblers mounted in said casing, each of said tumblers comprising a concealed lock-controlling element and an indicia-bearing element exposed for manipulation through a slot in said casing, couplings normally preventing relative movement between the composite elements of said tumblers, individual disabling devices accessible from the exterior of the assembled lock, whereby the respective couplings may be selectively rendered ineffective, thereby permitting the indicia-bearing element of any of said tumblers to be moved to effect a change in the combination of the lock while its lock-controlling element is held fast, and movement-obstructing elements movable into and out of effective positions by movements of said bolt, whereby movement of the lock-controlling elements may be prevented during a change of the combination.

5. A permutation wheel for keyless locks comprising a lock-controlling element having a recess at one side, an indicia-bearing element extending about said lock-controlling element, a slotted disk fitted within said indicia-bearing element for closing said recess of the lock-controlling element, and a yieldably-engaged coupling in said recess for binding the composite elements of the wheel together and against relative rotation, said coupling having a part projecting slidably through said slotted disk for manipulation from the exterior of said recess.

6. A lock comprising a casing, a lock mechanism including a locking bolt movably mounted in the casing, a plurality of permutation tumblers in said casing, each comprising a lock-controlling element having a part at one side for cooperation with said bolt and a recess at its opposite side, an indicia-bearing element extending about said lock-controlling element, a slotted plate fitted within said indicia-bearing element for closing said recess of the lock-controlling element, a yieldably-engaged coupling in said recess for binding the composite elements of the tumbler together and against relative rotation, said coupling having a part projecting through said slotted plate but concealed within the casing, and independent means mounted in and extending through the casing for operation from the exterior of the casing, whereby to engage said parts of the couplings and disengage said couplings to permit of relative rotation of the component elements of the tumbler elements.

In witness whereof, I have hereunto signed my name.

MEADE WILDRICK.